J. L. HORNIG.
VELOCIPEDE.
No. 191,145. Patented May 22, 1877.
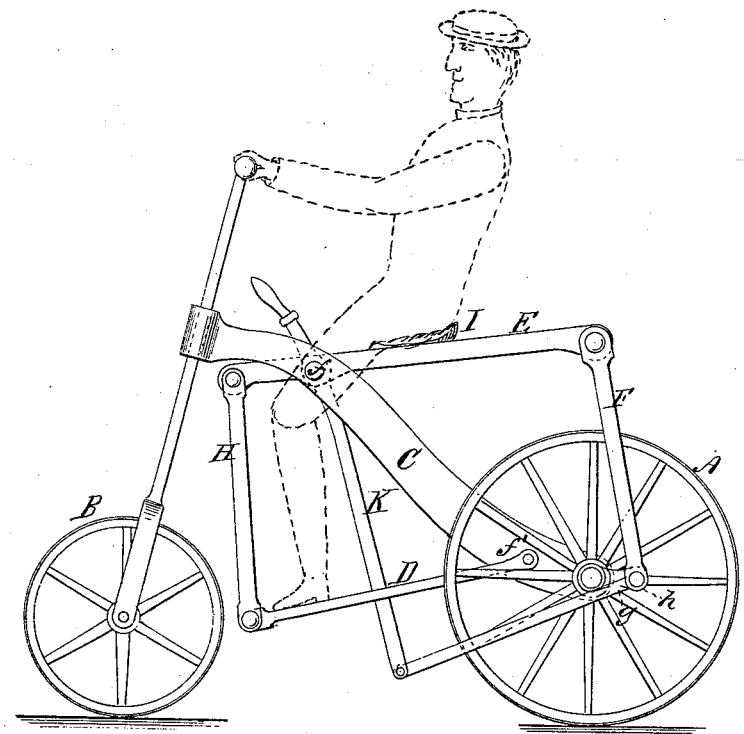

UNITED STATES PATENT OFFICE.

JULIUS L. HORNIG, OF JERSEY CITY, NEW JERSEY.

IMPROVEMENT IN VELOCIPEDES.

Specification forming part of Letters Patent No. 191,145, dated May 22, 1877; application filed April 3, 1877.

*To all whom it may concern:*

Be it known that I, JULIUS L. HORNIG, of Jersey City, in the county of Hudson and State of New Jersey, have invented an Improvement in Velocipedes; and I do hereby declare that the following is a full, clear, and exact description of the same, reference being had to the accompanying drawing, forming part of this specification.

This invention relates to certain improvements in velocipedes; and consists of a balance-beam carrying the driver's seat, and pivoted near its front end to an inclined reach extending from the axle of the rear wheel to the standard of the front wheel, said balance-beam having pivoted at its rear end a rod, which is pivoted to the crank on the axle of the driving-wheel, and at its front end a pivoted rod, which is pivoted at its lower end to a treadle, which latter is pivoted at its rear end to the aforesaid reach, all of which will be fully hereinafter described.

The invention is applicable to bicycles, three-wheeled or four-wheeled velocipedes.

The novel features of the invention will, however, be sufficiently illustrated by describing its application to a bicycle or two-wheeled velocipede, the accompanying drawing being a side view of such a velocipede with my improvement thereto applied.

A represents the driving-wheel, B the steering-wheel, C the reach, D the treadle, E the balance-beam, F the connecting-rod connecting the balance-beam with the crank $g$ of the driving-wheel B. H is the connecting-rod connecting the said balance-beam E with the treadle D, and I the saddle or seat on the balance-beam.

Said balance-beam or rocking lever E has its fulcrum attached to the reach C, a pivot, $f$, forming a convenient fulcrum.

The treadle D has its fulcrum attached to the reach C, a pivot, $f'$, connecting said treadle with said reach, forming a convenient fulcrum for said treadle.

The connecting-rod F is pivoted at its upper end to the rear end of the balance-beam E, and at its lower end to the wrist $h$ of the crank $g$.

The connecting-rod H is pivoted at its upper end to the front end of the balance-beam E, and at its lower end to the front end of the treadle D.

The saddle I may be made adjustable longitudinally on the balance-beam E, or it may be made to slide thereon longitudinally.

A hand-lever, K, pivoted to the reach, and connected with the crank $g$, serves to throw the crank off the center in starting the vehicle.

The saddle I may be a side-saddle for ladies' use, and two removable saddles may be provided for a single vehicle, one of which may be a side-saddle, and in this way a single velocipede may be used either by a gentleman or lady, or by boys and girls.

The operation of the invention is as follows: The rider throws his weight alternately on the treadle and on the seat, rising on his feet when throwing his weight on the treadle, and lowering himself upon the saddle again, as in riding a galloping horse. In this way the entire weight of the body is utilized, both in rising and falling, to propel the vehicle, the muscles being used in a far more advantageous manner, and furnishing a much more healthful exercise than in the propulsion of a velocipede by the use of first one foot and then the other in the highly-disadvantageous method of applying muscular power heretofore employed.

What I claim, and desire to secure by Letters Patent, is—

The balance-beam E, carrying the seat I and pivoted near the front end of the reach C, and the rod F pivoted to the rear end of the beam and connected to the crank $g$ of the driving-wheel, the rod H pivoted to the front end of the beam, and the treadle D pivoted to the lower end of the rod H and to the reach C, the whole being combined for operation substantially as shown and described.

JULIUS L. HORNIG.

Witnesses:
FRED. HAYNES,
BENJAMIN W. HOFFMAN.